No. 740,577. PATENTED OCT. 6, 1903.
J. F. MACKIN.
TROLLEY POLE.
APPLICATION FILED APR. 25, 1903.
NO MODEL.
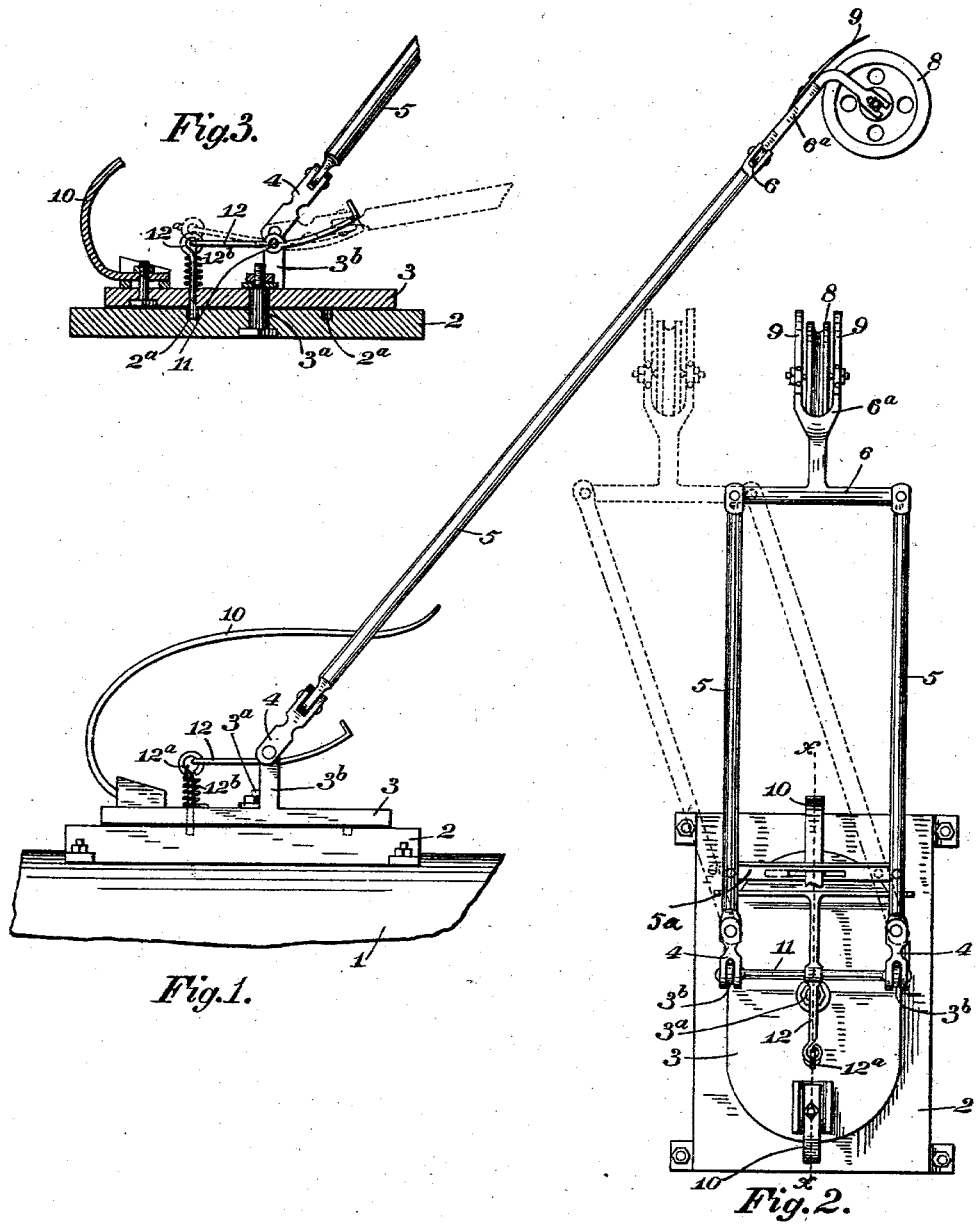
WITNESSES:
Walter Hamilton
Benj Finckel
INVENTOR
Joseph F. Mackin
BY
Finckel & Finckel
his ATTORNEYS No. 740,577.

Patented October 6, 1903.

UNITED STATES PATENT OFFICE.

JOSEPH F. MACKIN, OF COLUMBUS, OHIO.

TROLLEY-POLE.

SPECIFICATION forming part of Letters Patent No. 740,577, dated October 6, 1903.

Application filed April 25, 1903. Serial No. 154,315. (No model.)

*To all whom it may concern:*

Be it known that I, JOSEPH F. MACKIN, a citizen of the United States, residing at Columbus, in the county of Franklin and State of Ohio, have invented certain new and useful Improvements in Trolley-Poles; and I do hereby declare the following to be a full, clear, and exact description of the invention, such as will enable others skilled in the art to which it appertains to make and use the same.

The object of this invention is to provide an improved trolley-pole for electric cars of the kind in which the trolley or contact wheel is held at all times in a vertical plane to avoid the tendency of the trolley to leave the wire, especially when the car is passing around a curve and the trolley is pulled out of a plane passing longitudinally through the car.

The invention consists in the construction hereinafter described and claimed.

In the accompanying drawings, Figure 1 is a side view showing an embodiment of the construction. Fig. 2 is a top plan view illustrating in broken lines a position to which the trolley may be moved; and Fig. 3 is a vertical sectional view on the line $x\ x$, Fig. 2.

In the views, 1 designates a fraction of the roof of the car, and 2 a platform bolted to the roof.

3 is a turn-table resting on the platform and adapted to turn on a pin $3^a$, passing upward from the platform. The turn-table has rising from opposite sides thereof posts or ears $3^b$, to each of which is hinged to oscillate normally in a vertical plane longitudinally of the car the lower end of a short arm 4. Hinged to the upper end of each of the arms 4, so as to swing in planes at right angles to the plane in which said arms swing, are long arms 5. These long arms 5 are connected at their upper ends by a cross-arm 6 of such length that the arms 5 stand substantially parallel to each other. The cross-arm 6 is hingedly connected to the arm 5, so that as the structure swings to the right or left the cross-arm is maintained in a horizontal position. The fork or harp $6^a$, in which the trolley or contact wheel 8 is journaled, is attached to or formed as a part of the cross-arm 6. The trolley can be removably and adjustably secured in the harp, and spring-fingers 9, reaching above the top of the trolley 8, can be attached to the harp to assist in preventing the trolley from leaving the wire. The short arms 4, long arms 5, and cross-arms 6 can be viewed as a unit constituting the trolley-pole.

10 designates a stiff spring attached to the turn-table forward of the points of attachment of the pole and reaching rearward and having its free end passed through a slot in a cross-bar $5^a$, hingedly connected to the parallel arms 5. This spring will be of sufficient strength of course to throw the pole structure upward, so as to hold the trolley in contact with the wire. The slot in the cross-bar $5^a$ will permit free lateral movement of the pole if the spring itself is not made of sufficient flexibility laterally for this purpose.

As before stated, the turn-table may be turned on the platform 1. To permit the locking and unlocking of the turn-table, there is fulcrumed on a cross-bar 11, extending horizontally between the posts $3^b$, a lever 12, having attached to its forward end a pin $12^a$, and attached to the pin and the turn-table is a small spring $12^b$, tending to pull the pin and the forward end of the lever 12 down.

$2^a$ designates holes in the platform equidistant from the axis of the turn-table into which the lower end of the pin $12^a$ enters when the pole normally stands fore and aft the cars. The rear end of the lever 12 reaches behind the points of connection of the pole with the car and in position to be depressed by the pole when the latter is pulled down, and when it is desired to reverse the position of the pole on the car the pole is pulled down until the pin $12^a$ is lifted out of the hole $2^a$, as indicated by broken lines, Fig. 3, after which the turn-table can be given a half-rotation and the pole locked as before.

With this construction there is no more liability of the trolley to leave the wire when passing around a curve than when running on a straight wire, because the trolley or contact wheel is at all times maintained in vertical position.

In my claims I use the term "fork" or "harp" as designating not only the fork or harp proper, but also the cross-arm 6, of which the shank of the fork is shown to form a part, and it will be noted that the position of the trolley on its bearing or shaft is not laterally shifted by the lateral swinging of the pole-arms 5.

What I claim, and desire to secure by Letters Patent, is—

1. A trolley-pole comprising in combination with a turn-table 3 seated on the top of the car and means for latching the same, a pair of pole-arms each of which consists of two parts hinged together and to the turn-table so as to permit the pole to swing in a vertical plane as well as laterally with respect to the car independently of the turn-table, a bar hingedly connecting the upper ends of the pole-arms and containing a bearing for the trolley-wheel and a cross-bar $5^a$ hingedly connecting said arms.

2. A trolley-pole comprising in combination with a turn-table 3 seated on the top of the car and means for latching the same, a pair of pole-arms each of which consists of two parts hinged together and to the turn-table so as to permit the pole to swing in a vertical plane as well as laterally with respect to the car independently of the turn-table, a bar hingedly connecting the upper ends of the pole-arms containing a bearing for the trolley-wheel, a cross-bar $5^a$ also hingedly connected to said arms and a spring attached to the turn-table engaging said cross-bar $5^a$.

3. A trolley-pole comprising in combination with a turn-table seated on the top of the car, long parallel hingedly-connected trolley-supporting arms having a vertically and laterally movable hinged connection with said turn-table near the roof of the car, and means supported on and movable with the turn-table for automatically latching said platform adapted to be operated by moving said parallel arms.

In testimony whereof I affix my signature in presence of two witnesses.

JOSEPH F. MACKIN.

Witnesses:
BENJ. FINCKEL,
WALTER HAMILTON.